C. L. WITSAMAN.
SELF ADJUSTING TIRE INNER TUBE PROTECTOR.
APPLICATION FILED DEC. 11, 1915.
Reissued Jan. 25, 1916.
14,056.
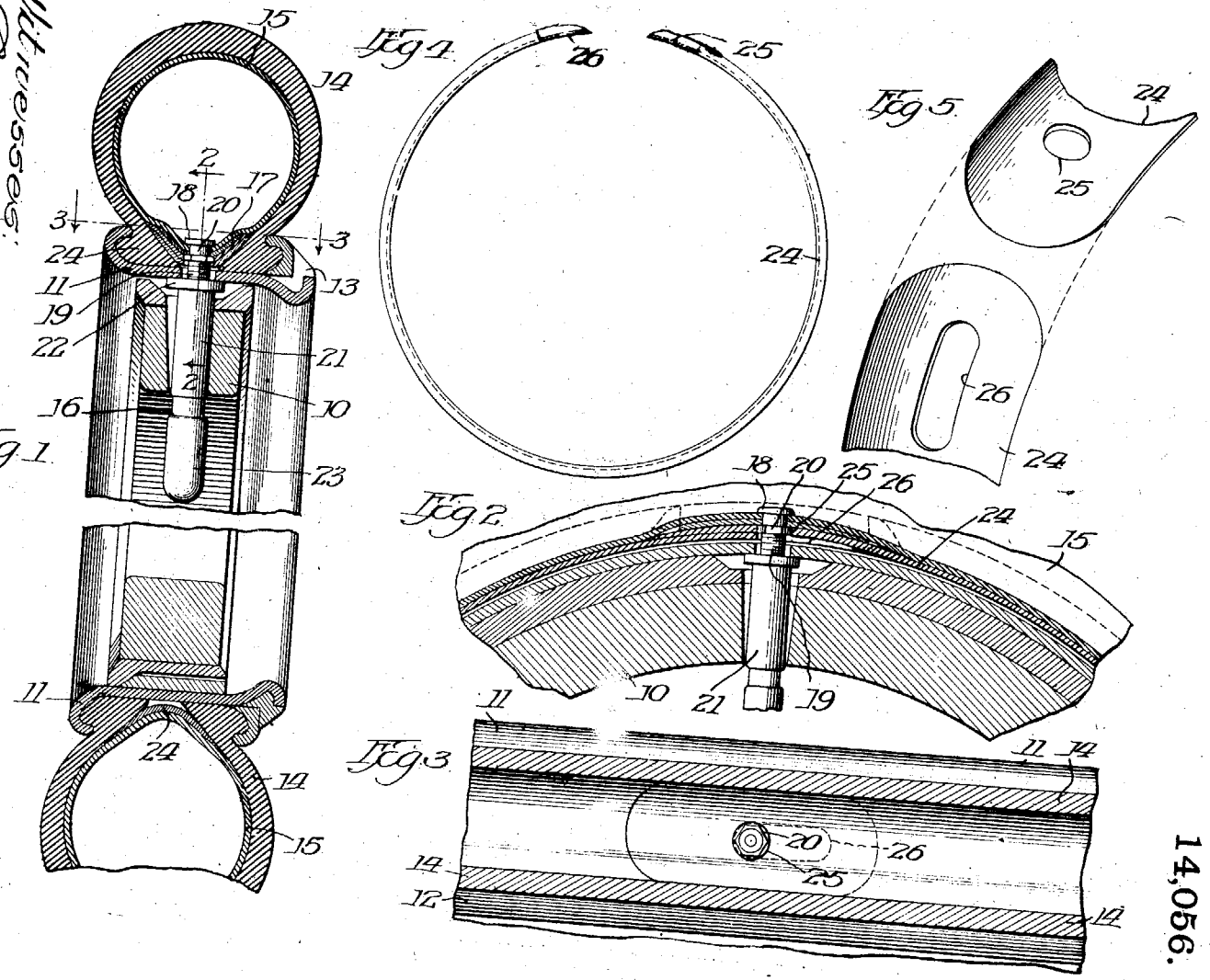
Witnesses:
Geo. G. Davison
Louis F. Geist
Inventor
Clement L. Witsaman
By C. C. Kirkham
Atty.

UNITED STATES PATENT OFFICE.

CLEMENT L. WITSAMAN, OF CUYAHOGA FALLS, OHIO, ASSIGNOR TO THE FIRESTONE TIRE & RUBBER COMPANY, OF AKRON, OHIO, A CORPORATION OF OHIO.

SELF-ADJUSTING TIRE INNER-TUBE PROTECTOR.

14,056. Specification of Reissued Letters Patent. Reissued Jan. 25, 1916.

Original No. 1,096,980, dated May 19, 1914, Serial No. 616,926. Application for reissue filed December 11, 1915. Serial No. 66,401.

*To all whom it may concern:*

Be it known that I, CLEMENT L. WITSAMAN, a citizen of the United States, residing at Cuyahoga Falls, in the county of Summit and State of Ohio, have invented certain new and useful Improvements in Self-Adjusting Tire Inner-Tube Protectors, of which the following is a specification.

My invention relates to tires for vehicles, and refers particularly to a protector used between the inner and outer tube of a tire.

In the ordinary form of pneumatic tire it is necessary to provide some form of protector in order to prevent the inner tube from coming in contact with the tire rim and being squeezed or distorted between the two sides of the outer tube where they are attached to the tire rim. Such a protector often consists of a flap, which is cemented or otherwise suitably attached to one side of the tire, and when the latter is placed in position this flap engages the opposite side of the tire, and thus prevents the inner tube from projecting into the space between the two sides of the tire which are held by the tire rim. The use of a flap of this description is open to several objections, among the principal of which may be mentioned the fact that on inflating the tire the flap is not able to accommodate itself to the shape of the inner tube, but is very apt to become wrinkled.

In my improvement I provide a protector which is not connected directly to the outer tube of the tire but engages the inner tube thereof and consists of some suitable flexible material capable of conforming to the changing shape of the tire during inflation. One end of this protector is provided with a hole, through which the valve associated with the inner tube passes, and the other end of the protector is provided with a slot, which is brought into register with the hole in the first end of the protector, the valve passing also through this slot. After the inner tube has been placed within the outer tube and is inflated, it will be clear that the protector accommodates itself exactly to the shape of the inner tube by reason of its flexibility, longitudinal movement being permitted by means of the above described slot in one end of the protector. After the inner tube has been inflated to the desired amount, the spreader associated with the valve is firmly clamped in position by adjustment of the cap valve, and at the same time this serves to securely clamp the ends of the protector between the inner tube and the tire rim.

These and other advantages of my invention will be more apparent by reference to the accompanying drawings, which represent a preferred form of my improvements, and in which—

Figure 1 is a fragmentary vertical section through a vehicle wheel, with the tire and its associated parts applied thereto; Fig. 2 is a fragmentary vertical section on the line 2—2 of Fig. 1; Fig. 3 is a horizontal section on the line 3—3 of Fig. 1; Fig. 4 is a side elevation of the protector for the inner tube before it has been applied thereto, and Fig. 5 is a fragmentary enlarged perspective view of the ends of the protector.

The felly 10 is provided with a tire rim 11, of the so called detachable type, this rim having the retaining member 12 and the locking ring 13. The outer tube 14 is held on the tire rim 11 with its retaining member 12, in the well-known manner.

The inner tube 15 is provided with the valve 16, the spreader 17 being securely held between the expanded head 18 of the threaded valve stem 19 and the nut 20. The valve stem 19 is inclosed by the sleeve 21 having the flange 22 on its outer end, which flange engages the inner surface of the tire rim 11. The sleeve 21 preferably projects inwardly to approximately the inner edge of the felly. The valve stem 19 is provided on its inner end with a valve cap 23, which has threaded engagement with the valve stem, and also engages the inner end of the sleeve 21. It will, therefore, be apparent that on screwing up the valve cap 23 the valve stem 19 will be drawn inwardly, whereas at the same time the sleeve 21 will be forced outwardly against the inner surface of the tire rim 11.

The inner tube protector 24 is located between the inner tube 15 and the outer tube 14, and, as clearly shown in Fig. 2, the valve stem 19 passes through the aperture 25 in one end of the protector and through the slot 26 in the other end thereof. As shown in Fig. 1, at that portion of the tire in which the spreader 17 is located the protector lies between the spreader and the outer tube.

The protector is applied to the inner tube by first inserting the valve stem 19 through the hole 25 of the protector. The protector is then placed in position around the inner tube, and the end having the slot 26 is then placed in position, the valve stem passing through said slot, one end of the protector overlapping the other, as shown in Figs. 2 and 3. The inner tube is then placed within the outer tube or casing 14, and the tire is inflated. During this operation the inner tube is gradually caused to engage the outer tube on the portions adjacent to the tire rim more and more snugly, thus causing the protector to contract longitudinally, which movement is allowed by the slot 26. In this way all liability of the protector binding at any point is prevented. When the tire is fully inflated the valve cap 23 is screwed home, thereby securely clamping the two ends of the tire protector together and preventing further longitudinal movement of the same.

By reason of the location of the apertures 25 and 26 in the longitudinal center of the flexible protector strip, said strip will assume a concave cross-sectional shape during inflation of the tire and thus effectually conform to the cross-sectional shape of the tire.

I have found that by the use of my device, which possesses the advantage of great simplicity and ease of construction, very superior results are obtained, in that the danger of binding is effectually prevented and the inner tube is readily applied within the outer tube or casing.

It will be apparent to those skilled in the art that many changes could be made in the detailed construction of the parts which I have described without departing from the spirit or scope of my invention.

What I claim is:

1. A tire of the inflatable, inner-tube type, having a valve stem and a spreader head thereon, and also provided with means to prevent pinching of the inner tube between the edges of the outer tube, consisting of a strip of flexible material capable of conforming to the changing shape of the tire longitudinally and transversely during inflation and lying between and unconnected with the inner and outer tubes and bridging the space between the edges of the outer tube, said strip extending entirely around the tire and having its ends overlapped, said strip associated with the valve stem to hold the strip against creeping and at the same time permit longitudinal sliding of the ends of the strip upon one another during inflation of the tire, said overlapped ends of the strip being smooth to facilitate the sliding of the ends upon one another.

2. A tire of the inflatable, inner-tube and clencher type, having a valve stem and a spreader head thereon, and also provided with means to prevent pinching of the inner tube between the edges of the outer tube, consisting of a strip of flexible material capable of conforming to the changing shape of the tire longitudinally and transversely during inflation and lying between and unconnected with the inner and outer tubes and bridging the space between the edges of the outer tube, said strip extending entirely around the tire and having its ends overlapped and associated with the valve stem to hold the strip against creeping and at the same time permit longitudinal sliding of the ends of the strip upon one another during inflation of the tire, said overlapped ends of the strip being smooth to facilitate the sliding of the ends upon one another.

In witness whereof I have hereunto signed my name in the presence of two subscribing witnesses.

C. L. WITSAMAN.

Witnesses:
J. J. SHEA,
A. L. ELY.